United States Patent [19]

Camras

[11] 3,833,920

[45] Sept. 3, 1974

[54] VIDEO TRANSDUCING ELECTRIC CIRCUITS

[75] Inventor: Marvin Camras, Glencoe, Ill.

[73] Assignee: IIT Research Institute, Chicago, Ill.

[22] Filed: Apr. 19, 1973

[21] Appl. No.: 352,593

Related U.S. Application Data

[60] Continuation of Ser. No. 182,202, Sept. 20, 1971, which is a division of Ser. No. 34,504, May 4, 1970, Pat. No. 3,705,954, which is a division of Ser. No. 649,256, June 27, 1967, Pat. No. 3,596,008, which is a continuation-in-part of Ser. No. 528,934, Feb. 21, 1966, abandoned.

[52] U.S. Cl. .................................... 360/33, 360/61
[51] Int. Cl. .......................... G11b 5/44, H04n 5/78
[58] Field of Search ............. 179/100.2 R, 100.2 K; 178/6.6 A; 330/21

[56] References Cited

UNITED STATES PATENTS 3,160,824 12/1964 Stair ............................ 179/100.2 R
3,316,360 4/1967 Colman, Jr. et al. ........ 179/100.2 R

*Primary Examiner*—Alfred H. Eddleman
*Attorney, Agent, or Firm*—Hill, Gross, Simpson, Van Santen, Steadman, Chiara & Simpson

[57] ABSTRACT

Monochrome and color television recording and playback circuitry for coupling of a video magnetic transducer head with a standard broadcast television receiver, the circuitry including a coupling capacitor and means for supplying electric charge to one terminal of the capaictor, a record-playback switch connected between the other terminal of the capacitor and one terminal of the head winding, and a resistor for maintaining the other terminal of the capacitor substantially at ground potential while the switch is in playback position to prevent surges of current through the head winding during switching.

1 Claim, 2 Drawing Figures

VIDEO TRANSDUCING ELECTRIC CIRCUITS

CROSS REFERENCES TO RELATED APPLICATIONS

The present application is a continuation of my pending application Ser. No. 182,202 filed Sept. 20, 1971, which in turn is a division of my earlier application Ser. No. 34,504 filed May 4, 1970 (now U.S. Pat. No. 3,705,954 issued Dec. 12, 1972). Said application Ser. No. 34,504 is a division of my earlier application Ser. No. 649,256 filed June 27, 1967 (now U.S. Pat. No. 3,596,008 issued July 27, 1971). Said application Ser. No. 649,256 is a continuation in part of my earlier application U.S. Ser. No. 528,934 filed Feb. 21, 1966 (now abandoned in favor of my copending application Ser. No. 62,601 filed Aug. 10, 1970, and issued as U.S. Pat. No. 3,683,107 dated Aug. 8, 1972).

Reference is made in compliance with the requirement of 35 U.S.C. 120 to my copening application Ser. No. 182,202, and to my earlier applications Ser. No. 848,992 filed Aug. 11, 1969 (now abandoned), Ser. No. 34,504 filed May 4, 1970 aforesaid, Ser. No. 62,601 filed Aug. 10, 1970 aforesaid, Ser. No. 389,021 filed Aug. 12, 1964 (now U.S. Pat. No. 3,469,037 issued Sept. 23, 1969), Ser. No. 401,832 filed Oct. 6, 1964 (now U.S. Pat. No. 3,495,046 issued Feb. 10, 1970), Ser. No. 493,271 filed Oct. 5, 1965 (now U.S. Pat. No. 3,531,600 issued Sept. 29, 1970), Ser. No. 528,934 filed Feb. 21, 1966 aforesaid, and Ser. No. 649,256 filed June 27, 1967 aforesaid.

BACKGROUND OF THE INVENTION

An important problem in the magnetic recording art relates to the need for a video transducer apparatus which can be manufactured at a reasonable cost and yet which will provide quality transducing of television signals, and particularly color television signals and the associated audio signals.

SUMMARY OF THE INVENTION

This invention relates to a wide band transducing system and method, and particularly to a system for recording and/or reproducing black and white and color television signals.

It is an object of the present invention to provide an economical television transducing system such as would be particularly suitable for home or educational uses.

Identification of Non-Essential Incorporated Herein for Purposes of Indicating the Background of the Invention The disclosure of the present invention set forth hereinafter is taken from the disclosure relating to FIGS. 6A and 6B of my U.S. Pat. No. 3,569,008 issued July 27, 1971, and reference is hereby made to the remaining portions of the disclosure physically present in said U.S. Patent as comprising non-essential subject matter for purposes of indicating the background of the invention.

DESCRIPTION OF THE PREFERRED EMBODIMENT

Figure 2:
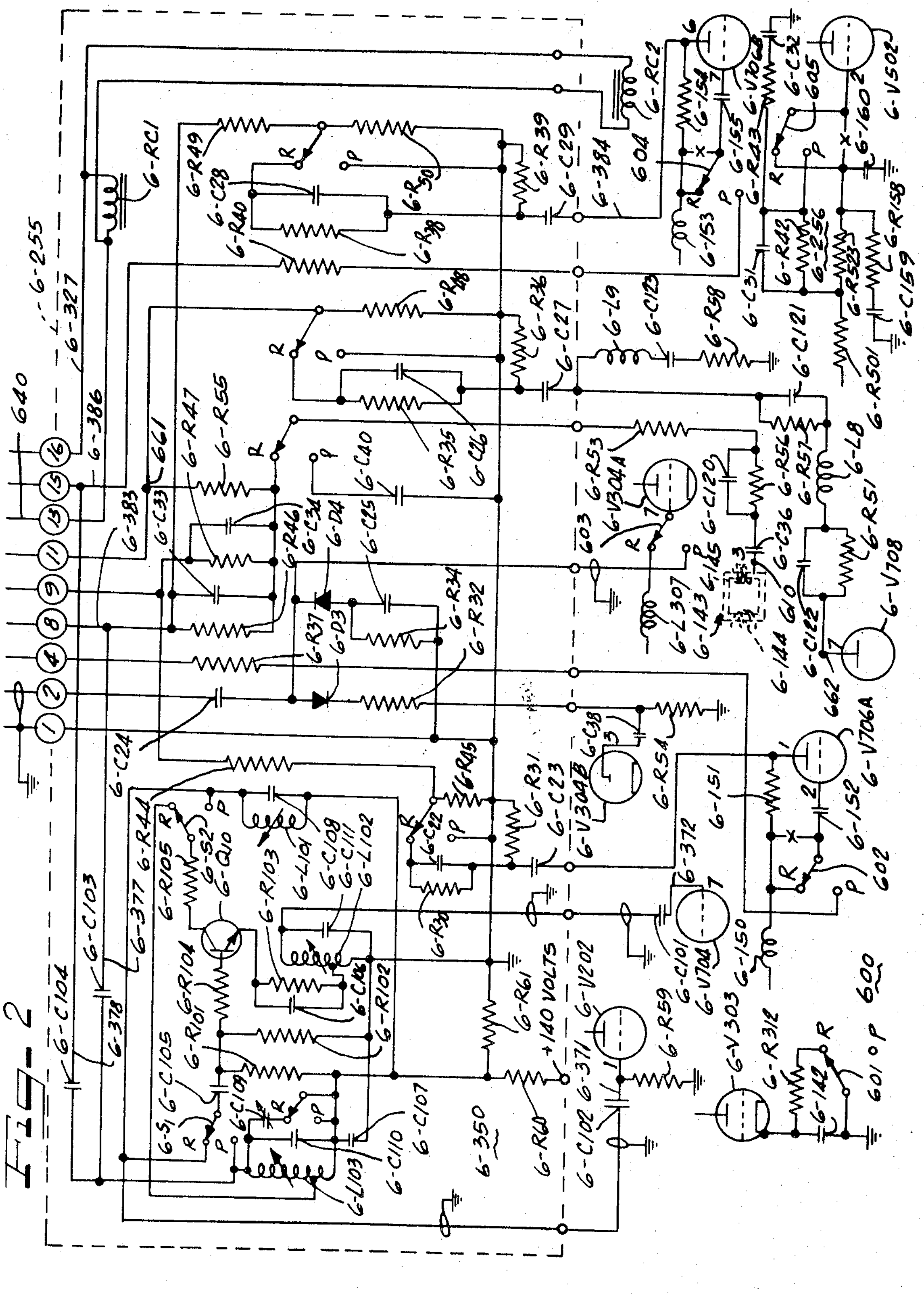

Referring to FIG. 2, the lower part of the drawing may represent a conventional color television receiver 600. More specifically, the receiver 600 may comprise an RCA Model CTC16XH color television chassis with certain modifications as hereafter described.

The original circuit of receiver 600, FIG. 2, has been broken in a number of points as will be apparent to those skilled in the art, for example at the locations indicated by a small *x* and the separated circuit points are selectively connectable by means of relay contacts such as indicated at 601–605 which are under the control of relay coil 6-RC2 of a six-pole double-throw relay. At other places in receiver 600 of FIG. 2, tube elements, circuit components and conductive connections are not shown for the sake of simplicity since such elements remain unchanged from the standard circuit.

It may be noted that capacitor 6-C36 connects with a terminal 610 of horizontal output transformer 6-143 which is designated as terminal number 3 in the commercial chassis.

Figure 1:
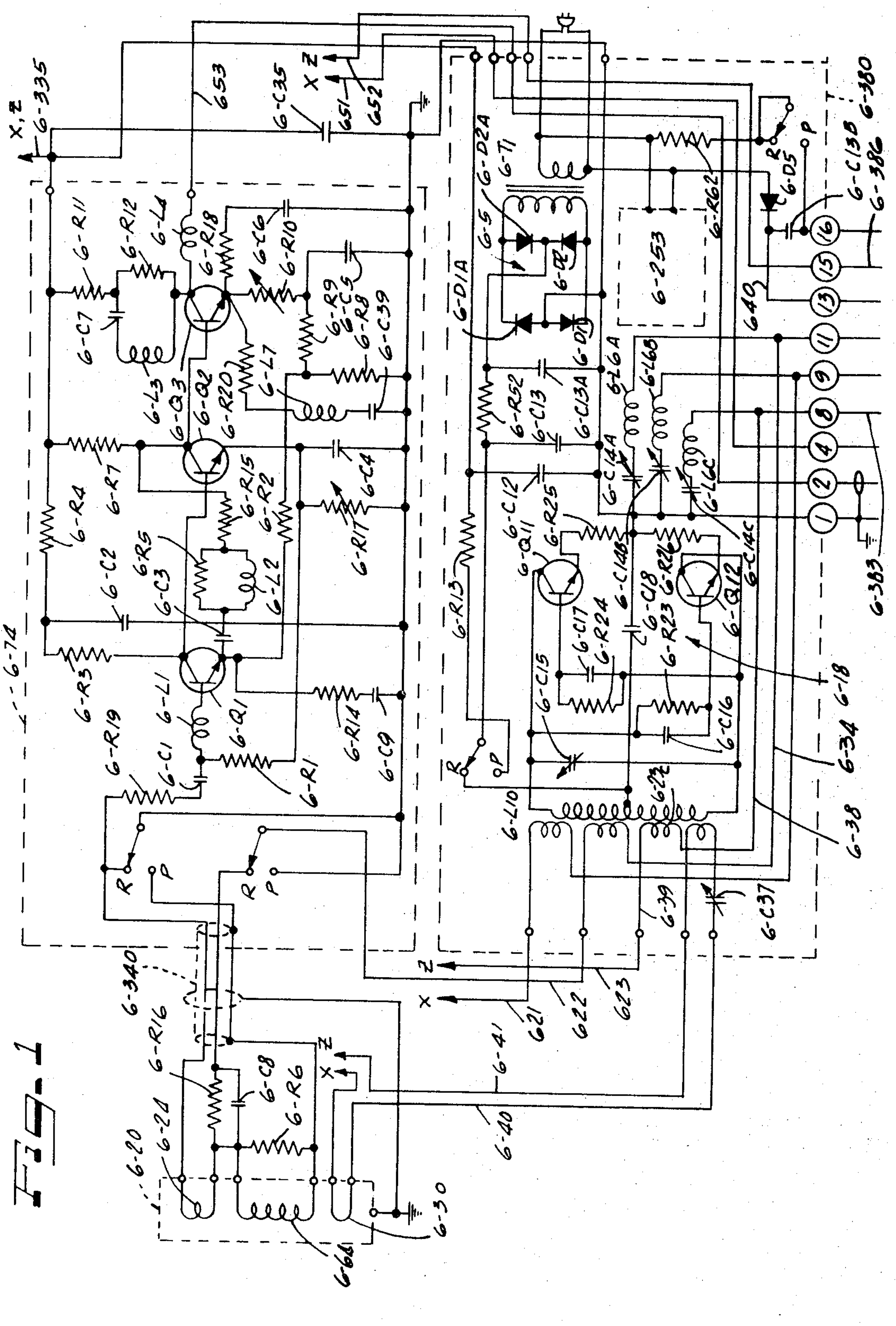
FIGS. 1 and 2 together show an electric circuit diagram for a magnetic recording and playback system for color television signals in accordance with the present invention, the circuitry of FIG. 2 being located below the circuitry of FIG. 1 as illustrated.

The components in the lower dash line rectangle 6-380 in FIG. 1 include preferred circuitry for the video bias component 6-18 as well as the bias frequency trapping networks 6-C14A, 6-L6A, 6-C14B, 6-L6B, and 6-C14C, 6-L6C and a power supply circuit 6-5.

The circuitry in the dash line rectangle 6-255 in FIG. 2 may be termed the adapter or coupling circuitry and consists of a junction box that receives a cable from the recorder unit (represented by block 6-380 in FIG. 1) and contains circuitry that is best located adjacent the television receiver 600 to minimize undersirable capacitance or stray coupling, and to simplify the cable connections. In other words, the adapter circuit 6-255 is physically disposed closely adjacent to the conventional video circuit components indicated at 600 in the lower part of FIG. 2.

The adapter circuitry 6-255, FIG. 2, includes preferred circuit elements for the equalizing circuits 6-R35, 6-C26; 6-R30, 6-C22, and 6-R38, 6-C28. Also included is preferred circuitry for the clamp circuit which comprises components 6-C24, 6-R32, 6-D3, 6-D4, 6-R34 and 6-C25. A stabilizing circuit 6-256 is indicated at the lower right of FIG. 2 and is associated with the horizontal control circuit of the receiver circuitry including elements 6-R501, 6-R523, 6-R158, 6-C159 and 6-160, 6-C31, 6-R42, 6-R43 and 6-C32.

Referring to FIG. 2, resistors 6-R37 and 6-R40 (of adapter 6-255) in the circuit coupling the color playback preamplifiers to the R-Y and B-Y amplifiers in the TV receiver 600 set tthe clamping levels of the (R minus Y) and (B minus Y) amplifiers 6-V706A and 6-V706B, respectively, by loading the grid circuits and thus determining the grid currents that flow as a result of pulses in the cathode circuits of the amplifier tubes 6-V706A and 6-V706B. The pulses are fed from the plate of a tube V707B of the conventional chassis to the cathodes of tubes V706A and V706B. Resistors R37 and R40 may be adjustable with values of 5600 and 18,000 ohms, respectively, having been found to give a white background when no color picture is present. Without these resistors the playback color balance is seriously upset.

During recording, negative pulses from terminal 3 of the winding indicated at 6-145 of the horizontal output transformer are fed to the recording head circuit 6-380 through components such as series capacitor 6-C36, series resistor 6-R53 and RC network 6-R56, 6-C120. These components shape the negative current pulses from the horizontal output transformer so that they effectively neutralize similar pulses from the output of the color amplifier tubes 6-V706A and 6-V706B. If the latter pulses are not cancelled they will be recorded as part of the color signal, and upon playback these pulses will upset the operating levels of the color circuits, giving incorrect color rendition. Also the presence of these unnecessary pulses tends to limit the recording levels or to overload the magnetic record tape. Alternatively it is possible to counteract during playback the effects of the color signal pulses if these are not neutralized. This may be done by applying a corrective bias to the grid or plate circuit of tubes 6-V706A and 6-V706B or the grids of the picture tube. It is preferable, however, to record the color signals without their blanking-interval pulses, or with these pulses greatly reduced, and this mode of operation has been illustrated in FIG. 2.

Switch 601 is in series with cathode resistor 6-R312 of tube 6-V303 and renders this IF stage inoperative during playback to prevent feedthrough of broadcast signals from interferring with the tape playback operation.

Inductor 6-L8 in the receiver circuitry 600 of FIG. 2 reduces loading of the television signal circuits by the connection of the recording head circuit, reduces interference from the high frequency bias circuit, and serves to increase the amplitude of the high frequency components of head energizing current because of a series resonance effect with the video head circuit capacitance. Resistors 6-R44 and 6-R49 in the adapter circuit 6-255 similarly serve in the (R minus Y) and (B minus Y) recording head circuits.

In FIG. 1, power supply circuit 6-5 includes a bridge circuit giving an output voltage of 35 volts to the bias frequency oscillator circuit 6-18.

The circuitry of FIGS. 1 and 2 is converted from the recording mode illustrated to the playback mode by actuating the record-play selector relays associated with coils 6-RC1 and 6-RC2 to shift the associated contacts from the "R" to the "P" positions.

When the cable is unplugged from the adapter circuitry 6-255 the receiver circuitry 600 may be utilized independently on the circuitry of FIG. 1 to receive and display broadcast television signals. In this case, the switches of the adapter circuitry 6-255 are placed in record mode. If the various switches are relay operated, as shown, their normal positions would be in the record mode, and unplugging of the cable would de-energize the relay or relays to automatically place the adapter circuitry 6-255 in the record mode. Suitable relay coils are indicated at 6-RC1 and 6-RC2 in FIG. 2 and these relays are shown as being energized from the power supply 6-5, FIG. 1, via conductors 640 and 6-327. The relay coils preferably control each of record-play selector switches, moving the switches from R to P position when energized. Simply by way of example when the cable is coupled to the adapter 6-255, the relays may be energized to place the circuitry of adapter 6-255 in playback mode by actuating the record-play switch controlling the contacts in FIG. 1. The circuitry of FIG. 1 is preferably adjacent the tape deck, and the selector switches of FIG. 1 are ganged for conjoint manual operation. Thus all of the record-play switches in both the recorder and TV set are shifted by operating a single control.

Referring to FIG. 2, the resistors 6-R31, 6-R36 and 6-R39 serve to maintain the upper terminals respectively of capacitors 6-C23, 6-C27 and 6-C29 at direct current ground potential (while the circuitry is in the playback mode) so as to prevent surges through the associated head windings during switching. These coupling capacitors have appreciable direct current potential across them during recording so that in the absence of the resistors, a charging of the capacitors would occur through the associated head windings when switching the circuitry between playback and record mode. Such current surges through the head windings would tend to produce residual magnetization of the head cores. (Such residual magnetization has various detrimental effects including noise and possible partial erasure of a signal recorded on the record medium.) Referring to the circuitry of FIGS. 1 and 2, it will be observed that the video windings such as 6-24 have their upper terminals at direct current ground potential in the recording mode so that no current surges to the head windings will be produced where the upper terminals of the capacitors are maintained at direct current ground potential during switching.

As set forth in Table VIII of the referenced Pat. No. 3,596,008, the presently preferred value for each of the resistors 6-R31, 6-R36 and 6-39 is 470 kilohms, while the presently preferred value for each of the capacitors 6-C23, 6-C27 and 6-C29 is .25 microfarad.

My U.S. Pat. No. 3,705,954 issued Dec. 12, 1972 is directed to the recording equalizing circuit of FIGS. 1 and 2 including components such as 6-R35 and 6-C26 of adapter circuit 6-255, FIG. 2, and components 6-R16 and 6-C8, FIG. 1.

I claim as my invention:

1. A transducer system comprising:

a magnetic head having a magnetic core for coupling to a magnetic record medium and having an electric winding (6-24) inductively coupled to the magnetic core, said electric winding (6-24) during recording having one terminal thereof connected to a circuit point having a predetermined direct current potential, a circuit including a coupling capacitor (6-C27) and means for supplying electric charge to one terminal of said capacitor (6-C27) and an electric switch connected between the other terminal of the capacitor (6-C27) and the other terminal of the electric winding (6-24), and resistance means (6-R36) having one terminal coupled via a direct current path to said circuit between said other terminal of said capacitor (6-C27) and said switch, and having its other terminal connected via a direct current path to said circuit point having said predetermined direct current potential, the switch in its record position during recording operation connecting the other terminal of said capacitor (6-C27) with said electric winding (6-24), and in its playback position during playback operation being open to open circuit any path for signal current from said capacitor (6-C27) to said electric winding (6-24), said resistance means (6-R36) being permanently coupled to said other terminal of said capacitor (6-C27) to continuously provide a direct current path to said circuit point of said predetermined direct current potential for maintaining said other terminal of said capacitor (6-C27) at substantially the same direct current potential as said electric winding (6-24) both while said switch is open and during switching from its recording position to its playback position, and from its playback position to its recording position, said resistance means (6-R36) providing the only direct current path from said other terminal of said capacitor (6-C27) to said circuit point in the playback position of said switch.

* * * * *